(No Model.) 2 Sheets—Sheet 1.
L. S. McMULLEN
COTTON CHOPPER.
No. 263,660. Patented Aug. 29, 1882.
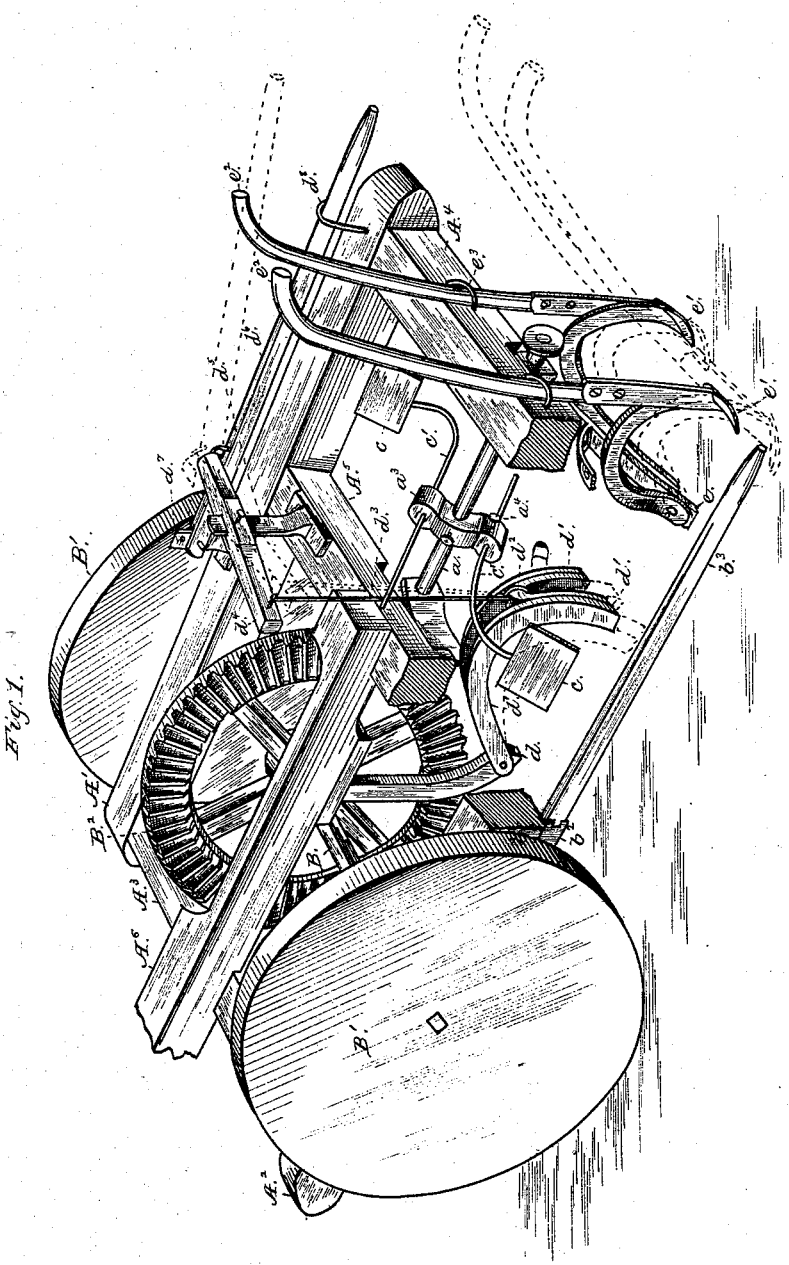

(No Model.) 2 Sheets—Sheet 2.
L. S. McMULLEN.
COTTON CHOPPER.
No. 263,660. Patented Aug. 29, 1882.
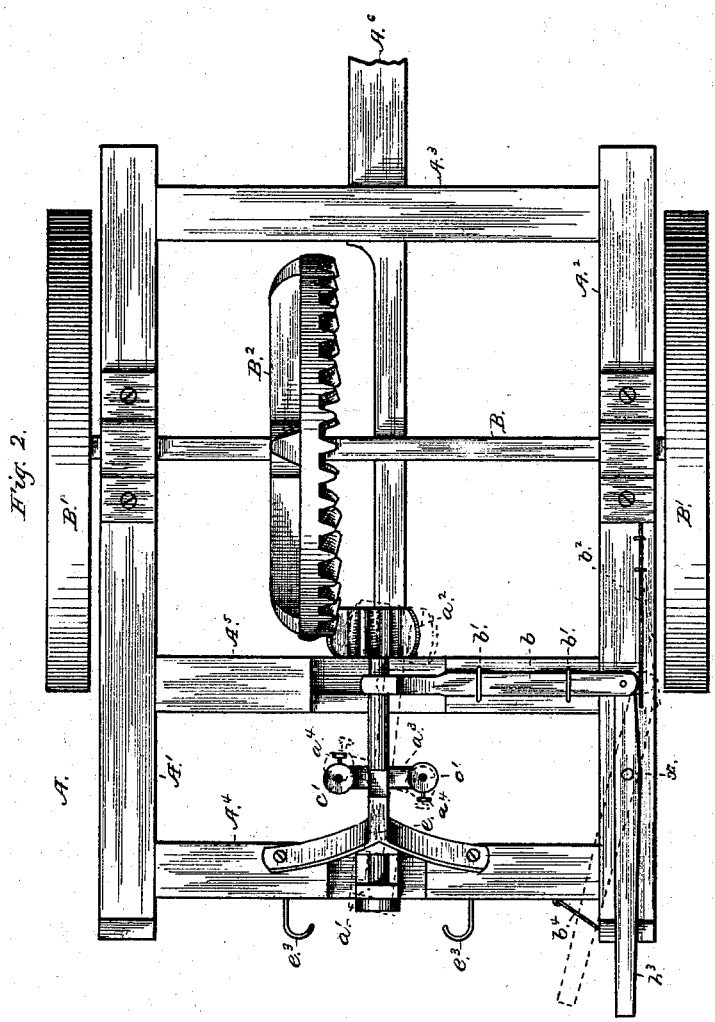

UNITED STATES PATENT OFFICE.

LEWIS S. McMULLEN, OF ATLANTA, GEORGIA, ASSIGNOR OF ONE-HALF TO JACOB McKINLEY, OF SAME PLACE.

COTTON-CHOPPER.

SPECIFICATION forming part of Letters Patent No. 263,660, dated August 29, 1882.

Application filed April 22, 1882. (No model.)

*To all whom it may concern:*

Be it known that I, LEWIS S. MCMULLEN, a citizen of the United States, residing at Atlanta, in the county of Fulton and State of Georgia, have invented certain new and useful Improvements in Cotton-Choppers, of which the following is a specification, reference being had therein to the accompanying drawings.

This invention has relation to improvements in cotton-choppers.

It has for its object to furnish a device which will readily and efficiently cut the gaps desired in the cotton-row, the chopping mechanism of which can be readily thrown out of gear, when so desired, and also to provide, in connection with the chopping mechanism, plow-shovels arranged in pairs in front and rear of the chopper, and also to construct the several parts of the machine so it will be under the easy control of the operator, as will be described.

In the drawings, Figure 1 is a perspective view with part of the framing broken away, and Fig. 2 is an inverted plan with the plow-shovels removed, of a chopper constructed according to my invention.

A is the framing, composed of the front and rear bars, $A^3$ $A^4$, the side bars, $A'$ $A^2$, and the cross-bar $A^5$.

$A^6$ is the tongue, connected to front bar, $A^3$, and cross-bar $A^5$.

B is the axle, journaled in the side bars, $A'$ $A^2$.

$B'$ are the supporting-wheels, made fast to ends of axle B.

$B^2$ is a bevel-gear wheel keyed to axle B, slightly to one side of the center of the framing, with its teeth extended toward the center of the framing, and in position to mesh with pinion hereinafter described. This wheel $B^2$ is made somewhat smaller than wheels $B'$, so it will clear the ground in the operation of the machine.

$a$ is the shaft carrying the chopper. It is journaled at its rear end in the swiveled bracket $a'$, so that it may revolve freely, and also have the lateral motion indicated in dotted lines, Fig. 2. The shaft $a$, near its forward end, is journaled in the end of a sliding bar, $b$, which bar is secured to the under side of cross-bar $A^5$ by staples $b'$, so that it may have a motion back and forth, as will be described.

$a^2$ is a pinion fixed to forward end of shaft $a$, and constructed and arranged to mesh with wheel $B^2$, when so desired, and thus revolve the shaft, choppers, &c., when the machine is moved forward.

$a^3$ is the hoe-head, which is provided with a bearing at its middle to receive the shaft $a$, and it is held to the said shaft by a set-screw, so that it can be moved forward or backward, and made fast at any desired point, as may be desired. Holes are formed through the outer ends of the hoe-head transversely to the middle axle-bearing, and in line with the direction of the motion given to the hoes in the operation of the machine. $a^4$ are set-screws for holding the shanks of the hoes in the transverse openings in the hoe-head.

$c$ $c$ are the hoes or choppers, which are secured to handles or arms $c'$. The handles $c'$ are bent near their junction with and so as to give the proper set to the hoes. The straight part of the handle is put through the transverse holes in the hoe-head, and is secured in any desired position by the set-screws $a^4$. The hoes, when set in the head, as shown, are more easily and accurately adjusted, and are more easily repaired, when broken, than if they were secured to the head in such manner to be adjusted outward in radial lines from the shaft $a$.

$b^2$ is a spring-bar having one end secured to the under side of side bar, $A^2$, slightly in rear of the axle, and its other end arranged to bear against outer end of bar $b$, and hold the said bar in the position shown in Fig. 2, holding the pinion $a^2$ in mesh with wheel $B^2$.

$b^3$ is a bar pivoted at $x$ to under side of bar $A^2$. Its forward end is pivoted to the bar $b$, and its opposite end is carried to the rear of the framing in proper position to be grasped by the operator. By pressing bar $b^3$ to the left the bar $b$ is pulled to the right, carrying pinion $a^2$ out of mesh with wheel B, as indicated in dotted lines, Fig. 2. Thus the chopping mechanism can be thrown out of gear at a single motion.

$b^4$ is a hook arranged on end bar, $A^4$, adapted to secure the bar $b^3$ in the position shown in dotted lines, Fig. 2, when so desired. Thus when the end of a row has been reached the hoes may be thrown out of gear, stopping their chopping till the machine has been turned, thereby avoiding cutting up the cotton at the end of the row. They may also be stopped in striking a skip in the cotton, and thrown in at the proper time, so as to leave the cotton standing at either end of the gap. By the difference in size of the wheel $B^2$ and pinion $a^2$ the shaft $a$ is driven at a great speed, enabling the hoes to cut straight through the rows, avoiding the angling cut so objectionable.

$d$ is an arm secured and depending from that portion of the tongue extended between the bars $A^3 A^3$.

D represents the plow-beam. It is formed of a single bar of metal, bent upward and inward at its middle to provide the arm $d^2$ and plow-standards $d' d'$, and they are curved forward and brought together and pivoted to the lower end of depending arm $d$. The ends of standards and the arch support the shovels, which are arranged immediately in front of the point where the hoes cut the ground, and they are arranged to run on either side of the cotton and loosen the dirt, so the hoes will cut readily through the row. By this construction we provide a plow made in one piece, connected and braced by the intermediate arch, which extends over the growing cotton.

$d^3$ is a rod connected to arch $d^2$ of plows $d'$, and extended up above the framing and connected to inner end of bar $d^4$, which bar is pivoted on standard $d^5$, supported on cross-bar $A^5$. The outer end of bar $d^4$ is pivoted to handle $d^6$, which is pivoted at its forward end on standard $d^7$, supported on side bar, $A'$. The opposite end of handle $d^6$ is carried to the rear of the machine in position to be grasped by the operator, and it is secured by hook $d^8$. When it is released from hook $d^8$ it and the several parts connected therewith, including the plows or shovels $d' d'$, pass into the position indicated in dotted lines, Fig. 1.

$e$ is a standard supported at its upper end on the under side of the end beam, $A^4$. To its lower end are pivoted the forward portions of the shovels or plows $e'$. These plows are provided with handles $e^2$, and may be held up out of the way by hooks $e^3$, as indicated in full, or down, as indicated in dotted lines, Fig. 1. These shovels are arranged to run on each side of the cotton-row in same line with the plows $d' d'$, and cover the dirt up to the cotton standing, so as to prevent its falling.

It will be seen that the choppers $c c$ are supported between and in line with the plows $e' e'$ and $d' d'$.

The operation of my device will be readily understood on reference to the drawings. The chopping mechanism can be readily thrown out of gear, and the plows in front and rear of the hoes can be readily thrown into or out of the ground, as desired.

Having thus described my invention, what I claim, and desire to secure by Letters Patent, is—

1. The plow-beam D, formed of a single bar of metal bent upward and outward at its middle to provide an arch, $d^2$, and plow-standards $d' d'$, and having its ends curved forward and brought together, and provided with means whereby it may be attached to the pendent arm $d$, substantially as set forth.

2. The combination of the frame A, the pendent arm $e$, secured at the middle of the rear bar of the frame, the plows $e' e'$, pivoted to the lower end of the arm $e$, the pendent arm $d$, the plows or beam D, pivoted to the arm $d$, the lifting mechanism $d^4 d^5$, and the choppers $c c$, supported on the shaft $a$ and between and in line with the plows $e' e'$ and $d' d'$, substantially as set forth.

In testimony whereof I affix my signature in presence of two witnesses.

LEWIS S. McMULLEN.

Witnesses:
W. D. WEAVER,
DANIEL PITCHFORD.